Figure 1:
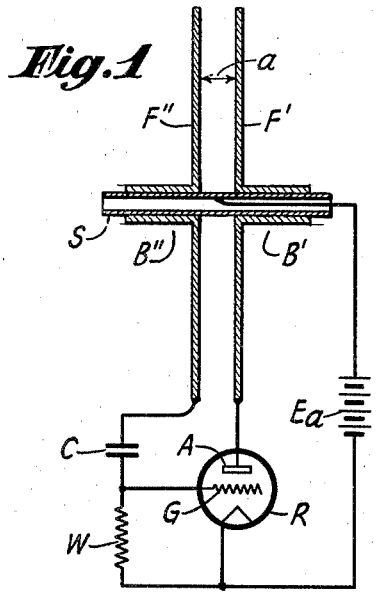

Oct. 1, 1940.  H. E. HOLLMANN  2,216,176
OSCILLATORY CIRCUIT
Filed June 18, 1938

INVENTOR.
HANS ERICH HOLLMANN
BY H. S. Grover
ATTORNEY.

Patented Oct. 1, 1940

2,216,176

UNITED STATES PATENT OFFICE 2,216,176

OSCILLATORY CIRCUIT

Hans Erich Hollmann, Berlin, Germany, assignor to Telefunken Gesellschaft für Drahtlose Telegraphie m. b. H., Berlin, Germany, a corporation of Germany Application June 18, 1938, Serial No. 214,435
In Germany July 3, 1937

8 Claims. (Cl. 250—36)

One excellent means to raise the fly-wheel resistance of an ultra-short wave resonance circuit and to still attain the matching value prescribed and required by the inner resistance of the oscillator tube even in the presence of ultra high frequencies, consists of the hollow or cylindrical circuit presenting axial symmetry (coaxial structure). The latter consists of two metallic cups or shells of semi-circular or rectangular cross-sectional shape, or of two similar spherical cups or caps or ellipsoids or the like fitted upon an axial tubular piece, or an axial rod and terminating in two equatorial flanges facing each other. Whereas the axial "pipe" or tube piece with the two metallic cups forms the inductance of the oscillation cricuit, the two flanges constitute the capacity of the oscillation circuit. It has been ascertained that such a hollow body or structure oscillates under quasi-stationary conditions; that is to say, in the center of the hollow body is formed a voltage node and a current loop (or anti-node), whereas, at the two capacitor flanges, crests in the potential wave are set up. It has also been discovered that the high fly-wheel resistance resides not so much in the relation between inductance and capacitance, but rather in the extraordinarily low damping resistance of the pipes and cups or caps (spheres) presenting a large area.

A close investigation of the oscillatory state and the natural frequency or wave of such hollow circuits has demonstrated that it is only the relatively large circuits involving large capacitance flanges that will satisfy the Thomson wave law, according to which the natural wavelength should be reduced with reduction of the capacitance of the oscillation circuit, which, in the present instance, is insured by moving the metal cups farther apart so that incidentally there results a greater distance between the two capacity or condenser flanges. Where very small circuits are dealt with, in which the hollow bodies have a diameter of only a few centimeters and in which the capacity flanges are relatively narrow, the Thomson rule will be found to hold good only for inter-flange distances up to around 1 millimeter. Above this spacing, the tuning curve follows an inverse trend, that is to say, the natural wave becomes longer again with increased spacing apart of the two metal cups or shells. This action may be explained by the fact that the extending or lengthening of the effective axial tube or pipe piece incidental to the shifting of the two metal shells, in other words, the incidental and corresponding growth of the inductance, surpasses the reduction in flange capacitance. And this proves that an appreciable portion of the inductance of such hollow circuits inheres in the axial tube.

Hence, if extremely short waves are to be used without incidentally reducing the dimensions of the hollow circuit unduly (and this, for instance, would be recommendable wherever the hollow circuit is to be employed for in-phase and counter-phase excitation of a great number of tubes distributed all around the periphery of the flanges), it will be found expedient to proceed in such a way that the effective axial tube should be shortened as much as feasible; in other words, the two metal shells should be fashioned as flat as feasible.

It is, fundamentally speaking, upon the proper understanding of these conditions that the "disc circuit" of the present invention, hereinafter to be disclosed, has been evolved. This disc circuit consists only of two radial metal discs spaced apart a comparatively great distance and seated upon an axial pipe piece.

A more complete description of the invention follows, in conjunction with the drawing, wherein Figs. 1 to 4, 5a and 5b illustrate various embodiments of the invention.

Fig. 1 shows, in section, a disc circuit of this nature in its basic form. A straight rod or a similar pipe piece S supports two metallic discs F' and F'' which are seated upon metallic bushes or sleeves B' and B'', the distance which spaces the discs apart as indicated by $a$ being varied by shifting the said bushes. It is also shown in this Fig. 1 in what way this disc circuit may be caused to oscillate by the aid of an electronic tube R. For this purpose the anode or plate A of the tube is directly united with one of the discs F', whereas the other disc is brought through a small blocking condenser C to the grid G, which in a way known from practice is brought back to the cathode of a suitable biasing voltage by way of the high-ohm resistance W. The plate is fed with potential by way of the disc circuit, in the wave node of which, located midway between the two discs upon the axial tube, is connected the plate lead. Inasmuch as it is immaterial in what particular point on the circumference of the disc the oscillator is connected, it will be seen that in this scheme a great number of tubes may be accommodated on and distributed over the periphery of the disc circuit. In this manner may be mounted a multi-tube transmitter in which all of the tubes oscillate in phase so that their radio frequency energy is integrated.

Figure 2:
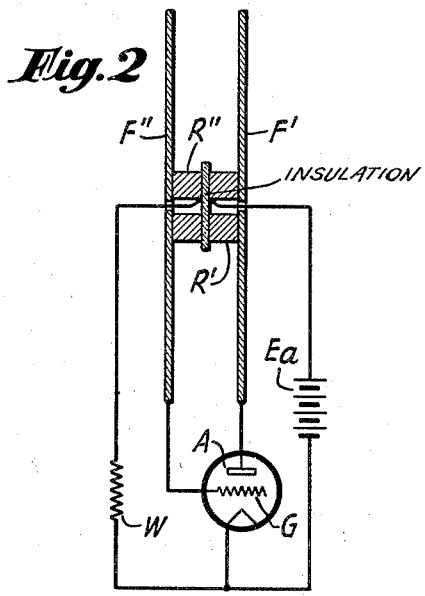
Figure 5A:
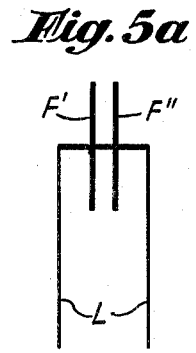

Since, where ultra high frequencies are concerned, it is known to be advantageous to avoid all circuit elements that are not absolutely necessary, and to make connecting leads carrying radio frequency energy of very reduced length, an organization of the kind illustrated in Fig. 2, designed for the generation of ultra short frequencies, will be found especially advantageous. This scheme distinguishes itself from the one before described only by its symmetric construction from the direct current viewpoint. Fitted upon the two metallic discs F' and F'' are two metallic heavy-walled tubular pieces or nipples R' and R'', with interposition of a tenuous layer of dielectric material, these nipple pieces are pressed together by the agency of an insulated screw or clamp device so that, from a radio frequency angle, there results practically the same disc circuit as shown in Fig. 1. The isolation for direct current voltage of the two metal discs which is thus obtained offers the advantage that now grid G and plate A of the oscillator, or of all oscillators, may be associated directly with the circumference of the two discs without necessitating any special blocking means such as provided in the case of Fig. 1 in the form of the grid condensers C. While the plate lead, just as in the previously described disc type transmitter, is united at a node of the oscillation in the disc circuit, in other words, in the tube portion R', the grid lead is brought to the tube portion R'' so that the grid by way of R'' and F'' may be impressed with a suitable voltage or be returned to a point of the circiut organization presenting a suitable potential. What is thus obtained is that the connecting wires being at radio frequency for the oscillator tubes are reduced to the least imaginable length, and that radio frequency energy is able to flow away neither by way of the plate potential lead nor the grid lead.

The state of oscillation of the described disc circuit differs basically from the hollow or spherical circuit known in the earlier art as hereinbefore stated, and this shall be demonstrated by the following considerations. If the distance $a$ between the two discs is chosen very small, then the inductance of the axial tube is practically zero; as a result, there remains almost nothing but the high capacitance between the two metal discs. However, this means nothing else but that under these circumstances the structure is a mere plate type condenser, and this, of course, would be unsuited for the excitation of oscillations. In fact, it is only when the inter-disc distance is made of a size or value so that the inductive current component determined partly by the axial tube and in part by the disc diameter becomes comparable with the decreasing current component of the pure disc capacity or surpasses the same that the resonance character of the disc circuit becomes apparent. It will therefore be obvious that the natural wave of the disc circuit from this instant will grow with growing inter-disc distance $a$ because of the rise of inductance of the axial tube. Where comparatively great distances are involved, that is, distances which would correspond in proportion and scale to the disc circuits shown in Figs. 1 and 2, the disc capacitance no longer plays any appreciable part, in fact, one may then conceive of the disc circuit as being a degenerated or distorted (or pseudo) parallel wire loop resulting from rotation about its terminating bridge under rotation symmetric conditions. The discs F' and F'' then represent the two parallel wires, while the axial tube constitutes the tuning or terminating bridge piece. In the light of this analogy, it can be readily seen that the natural wave of the disc circuit, just as in a parallel wire loop, must necessarily grow with extension of the parallel wires; in other words, with each and every increase of the disc radius as well as with an extension of the terminating bridge, that is, growth of inter-disc distance. Just as in the parallel wire type of transmitter, the disc circuit at its free or open end, in other words, at the circumference of the discs, carries load in the form of the capacities of the oscillator tubes, and these therefore enter in any determination of the natural wave and play a decisive role. In this regard the disc circuit hereinbefore described distinguishes itself from the plate type condenser subject to impulse excitation by central sparks, it being remembered in this connection that the natural wavelength thereof is a function exclusively of the radial dimensions, i. e., the disc or plate diameter and the spark diameter, while the inter-plate distance is immaterial.

All such improvements, steps and measures may here be used in connection with the disc circuit and the disc transmitter as are basically improvements upon the oscillatory state of the hollow circuit, and more particularly the spheric or ball type transmitter; that is to say, a transmitter comprising spheric metal cups or shells. This statement refers more particularly to such steps as are conducive to rendering the oscillations symmetric (symmetricizing means). In this connection there may be mentioned primarily the mounting of a radial center plate or sheet which may, for instance, be tensioned and stretched out between the two tubular pieces R' and R'', Fig. 2.

Figure 3:
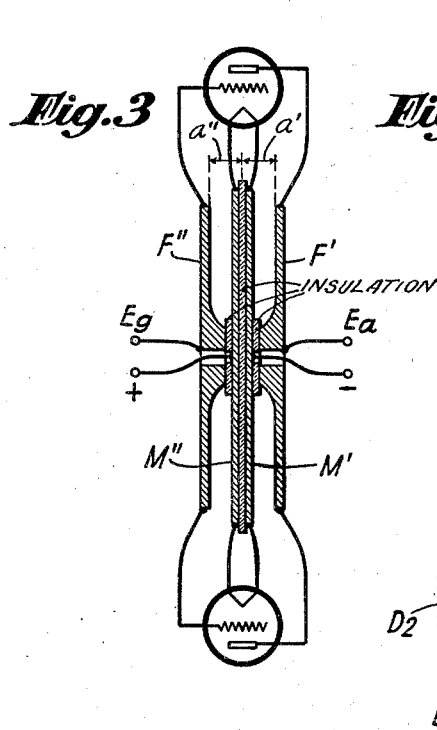
Figure 4:
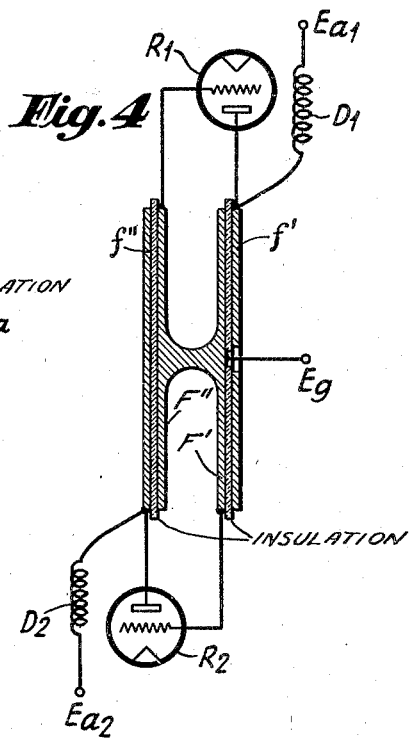

Referring to Fig. 3, if the said center piece is made to consist of two discs separated from each other by a tenuous layer of dielectric material, then the cathode pins of the oscillators may be fitted upon the two center sheets M' and M'', and in this manner a reliable and safe substitute or artificial ground can be created. Moreover, an arrangement of this kind offers the merit that the uneven capacitive load of the two discs due to the grid and plate capacitance of the tubes, by choosing different distances $a'$ and $a''$ between both discs and the center sheet, may be compensated.

Another mode of insuring symmetric conditions resides in the adoption of push-pull excitation which is predicated upon the fact that both discs have loads consisting of equal sums of grid and plate capacitance. A suitable circuit organization and structure that distinguishes itself by particularly great simplicity is to combine the requisite blocking condensers with the discs of the disc circuit properly so called as shown, for example, in Fig. 4. In this scheme the original disc circuit may be metallically terminated, that is to say, may be worked out of the solid. Screwed upon the two radial terminating surfaces, with interposition of insulating layers, are two further metal plates $f'$ and $f''$; and the capacity of these in reference to the other discs F' and F'' acts as a radio frequency short circuit. Grids and plates of the two oscillator tubes $R_1$ and $R_2$, whose place may be taken by groups of tubes comprising similar numbers of units, are alternately brought to both sides of the disc circuit so that each side, in a perfectly symmetrical manner, is loaded with a grid and with a plate, or with a corresponding plurality of electrodes. The original disc circuit is at grid potential which, as hereinbefore indicated, is insured by way of the lead brought to the center, while the two outer discs f' and f'' are impressed with plate potential by way of the choke coils D₁ and D₂. This method offers the advantage over the scheme shown in Fig. 3 that, from the outset, a symmetric state of oscillation is assured, and this, in the prior art, had to be established by suitable balancing of the distances a' and a''.

Figure 5B:
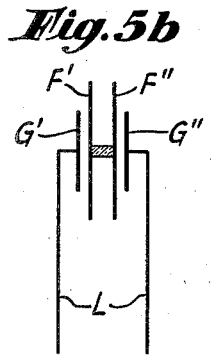

In conclusion, a few explanatory remarks may be made regarding the preferable utilization and the taking off (output) of radio frequency energy from the disc transmitter. If the oscillatory energy is to be sent off or radiated directly, it will suffice in the majority of cases to extend the axial tube either unilaterally or bilaterally to result in an antenna which is in galvanic (conductive) relationship with the disc circuit. If the radio frequency energy is to be taken off by way of a double wire line and is to be fed to a consumer or load, then the axial tube, in a way indicated in Fig. 5a, may be introduced as a terminating bridge in a Lecher wire line L; or else the Lecher wire line is coupled in a way as shown in Fig. 5b by the aid of distinct counter or cooperative plates G' and G'' capacitively with the discs F'' and F'', respectively. This plan offers the merit that the coupling may be varied and aligned by choosing suitable and optimal interplate distances.

It may finally be noted that the disc circuit, without any special modifications, may be employed in combination with any desired excitation means, such as, for instance, electric and magnetic retarding field (electron-oscillation) types of tubes such as magnetrons and Habann tubes operating with constant and with variable magnetic fields. The same disc circuit could be used in receivers.

What is claimed is:

1. A low loss oscillatory circuit comprising a pair of discs having relatively large flat conducting surfaces spaced parallel to one another, a path of low impedance to radio frequency energy of the operating frequency located between said discs in the center thereof and symmetrically arranged with respect to the peripheries of said discs, said path comprising a metallic conducting element extending between and insulated from both of said discs, said discs and said path forming inductances which together with the capacity between said discs constitute a resonant circuit at the fundamental mode of oscillation.

2. A low loss oscillatory circuit comprising a pair of discs having relatively large flat conducting surfaces spaced parallel to one another, a path of low impedance to radio frequency energy of the operating frequency located between said discs in the center thereof and symmetrically arranged with respect to the peripheries of said discs, said path comprising a metallic conducting element conductively connected to one of said discs from a direct current standpoint but insulated from the other disc, said discs and said path forming inductances which together with the capacity between said discs constitute a resonant circuit at the fundamental mode of oscillation.

3. A low loss oscillatory circuit comprising a pair of discs having relatively large flat conducting surfaces spaced parallel to one another, a path of low impedance to radio frequency energy of the operating frequency located between said discs in the center thereof and symmetrically arranged with respect to the peripheries of said discs, said path including a metallic conducting element conductively connected to each of said discs from a direct current standpoint, said elements being separated from each other by an insulating spacer, said discs and said path forming inductances which together with the capacity between said discs constitute a resonant circuit at the fundamental mode of oscillation.

4. A low loss oscillatory circuit comprising a pair of discs having relatively large flat conducting surfaces spaced parallel to one another, a short circuiting path for radio frequency energy located between said discs, said path comprising a pair of parallel discs coupled together and which are at least as large as said first discs and insulated therefrom, said first pair of discs and said path forming inductances which together with the capacity therebetween constitute a resonant circuit at the fundamental mode of oscillation.

5. A low loss oscillatory circuit comprising a pair of discs having relatively large flat conducting surfaces spaced parallel to one another, a short circuiting path for radio frequency energy located between said discs, said path comprising a pair of parallel discs which are at least as large as said first discs and insulated therefrom, the discs of said path being conductively connected together from a direct current standpoint by a conductor located between them in the center thereof and symmetrically arranged with respect to the peripheries thereof, said first pair of discs and said path forming inductances which together with the capacity therebetween constitute a resonant circuit at the fundamental mode of oscillation.

6. In combination, a low loss oscillatory circuit comprising a pair of discs having relatively large flat conducting surfaces spaced parallel to one another, a short circuiting path for radio frequency energy located between said discs, said path comprising a pair of parallel discs which are at least as large as said first discs and insulated therefrom, the discs of said path being conductively connected together from a direct current standpoint by a conductor located between them in the center thereof and symmetrically arranged with respect to the peripheries thereof, said first pair of discs and said path forming inductances which together with the capacity therebetween constitute a resonant circuit at the fundamental mode of oscillation, and an electron discharge device having a grid directly connected to a disc of one pair and an anode directly connected to a disc of the other pair.

7. In combination, a low loss oscillatory circuit comprising a pair of discs having relatively large flat conducting surfaces spaced parallel to one another, a short circuiting path for radio frequency located between said discs, said path comprising a pair of parallel discs coupled together and which are at least as large as said first discs and insulated therefrom, said first pair of discs and said path forming inductances which together with the capacity therebetween constitute a resonant circuit at the fundamental mode of oscillation, and an electron discharge device having a grid and an anode directly connected to different discs of said first pair and a cathode whose legs are connected to different discs of said second pair.

8. In combination, a low loss oscillatory circuit comprising a pair of discs having relatively large flat conducting surfaces spaced parallel to one another, a path of low impedance to radio frequency energy of the operating frequency located between said discs in the center thereof and symmetrically arranged with respect to the peripheries of said discs, said path comprising a metallic conducting element conductively connected to one of said discs from a direct current standpoint but insulated from the other disc, said discs and said path forming inductances which together with the capacity between said discs constitute a resonant circuit at the fundamental mode of oscillation, and an electron discharge device having a grid and an anode directly connected to different discs of said pair.

HANS ERICH HOLLMANN.